(12) United States Patent
Luo et al.

(10) Patent No.: US 12,282,368 B2
(45) Date of Patent: Apr. 22, 2025

(54) FAULT IDENTIFICATION OF MULTIPLE PHASE VOLTAGE REGULATOR

(71) Applicant: Dell Products L.P., Round Rock, TX (US)

(72) Inventors: Shiguo Luo, Austin, TX (US); Ralph H. Johnson, Round Rock, TX (US)

( * ) Notice: Subject to any disclaimer, the term of this patent is extended or adjusted under 35 U.S.C. 154(b) by 94 days.

(21) Appl. No.: 17/972,860

(22) Filed: Oct. 25, 2022

(65) Prior Publication Data

US 2024/0134433 A1 Apr. 25, 2024
US 2024/0231456 A9 Jul. 11, 2024

(51) Int. Cl.
| | |
|---|---|
| *G06F 1/26* | (2006.01) |
| *G06F 1/28* | (2006.01) |
| *H02M 1/084* | (2006.01) |
| *H02M 1/32* | (2007.01) |
| *H02M 3/00* | (2006.01) |
| *H02M 3/158* | (2006.01) |

(52) U.S. Cl.
CPC .............. *G06F 1/26* (2013.01); *H02M 1/084* (2013.01); *G06F 1/28* (2013.01); *H02M 1/32* (2013.01); *H02M 1/327* (2021.05); *H02M 3/003* (2021.05); *H02M 3/1584* (2013.01)

(58) Field of Classification Search
CPC ............ G06F 1/26; G06F 1/28; H02M 1/084; H02M 1/327; H02M 3/003; H02M 3/1584; H02M 1/32
See application file for complete search history.

(56) References Cited

U.S. PATENT DOCUMENTS

| | | | |
|---|---|---|---|
| 2011/0051479 A1 | 3/2011 | Breen et al. | |
| 2015/0236586 A1* | 8/2015 | Babazadeh | H02M 1/32 323/272 |
| 2019/0018071 A1* | 1/2019 | Subotski | H02H 7/1213 |
| 2019/0165679 A1 | 5/2019 | Mirjafari et al. | |
| 2020/0182706 A1* | 6/2020 | Maruyama | G01K 3/08 |

\* cited by examiner

*Primary Examiner* — Terrell S Johnson (74) *Attorney, Agent, or Firm* — Larson Newman, LLP (57) ABSTRACT

A voltage regulator system of an information handling system includes a voltage regulator and a voltage regulator controller. The voltage regulator includes multiple powerstages (Pstages). The voltage regulator controller communicates with the voltage regulator. The voltage regulator controller monitors for a first fault signal on a first pin of a circuit associated with a first Pstage of the Pstages. In response to a first voltage of the first fault signal at the first pin being greater than a threshold voltage, the voltage regulator controller monitors a second pin of the circuit for a second fault signal and determines whether a voltage of the second fault signal at the second pin is equal to a second voltage. Based on the voltage of the second fault signal being equal to the second voltage, the voltage regulator controller determines a first fault has occurred in the first Pstage.

20 Claims, 4 Drawing Sheets

FAULT IDENTIFICATION OF MULTIPLE PHASE VOLTAGE REGULATOR

FIELD OF THE DISCLOSURE

This disclosure generally relates to information handling systems, and more particularly relates to a fault identification of multiple phase voltage regulator.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A voltage regulator (VR) system of an information handling system includes a voltage regulator and a voltage regulator controller. The voltage regulator includes multiple power-stage devices (Pstages). The controller may communicate with the Pstages. The controller may monitor first fault signal pin (Ts) to determine if a fault occurred in system. If the first fault signal pin (Ts) is greater than a first threshold, the controller may determine that a fault occurred in a VR system. In order to further identify what type of fault occurred on what Pstage, the controller may monitor one more signaling pin, such as a dual-function Iout/fault2 pin. A basic function of dual-function Iout/fault2 may be for real-time phase current monitoring for a Pstage. The second function of dual-function Iout/fault2 may be to identify a fault type and location.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
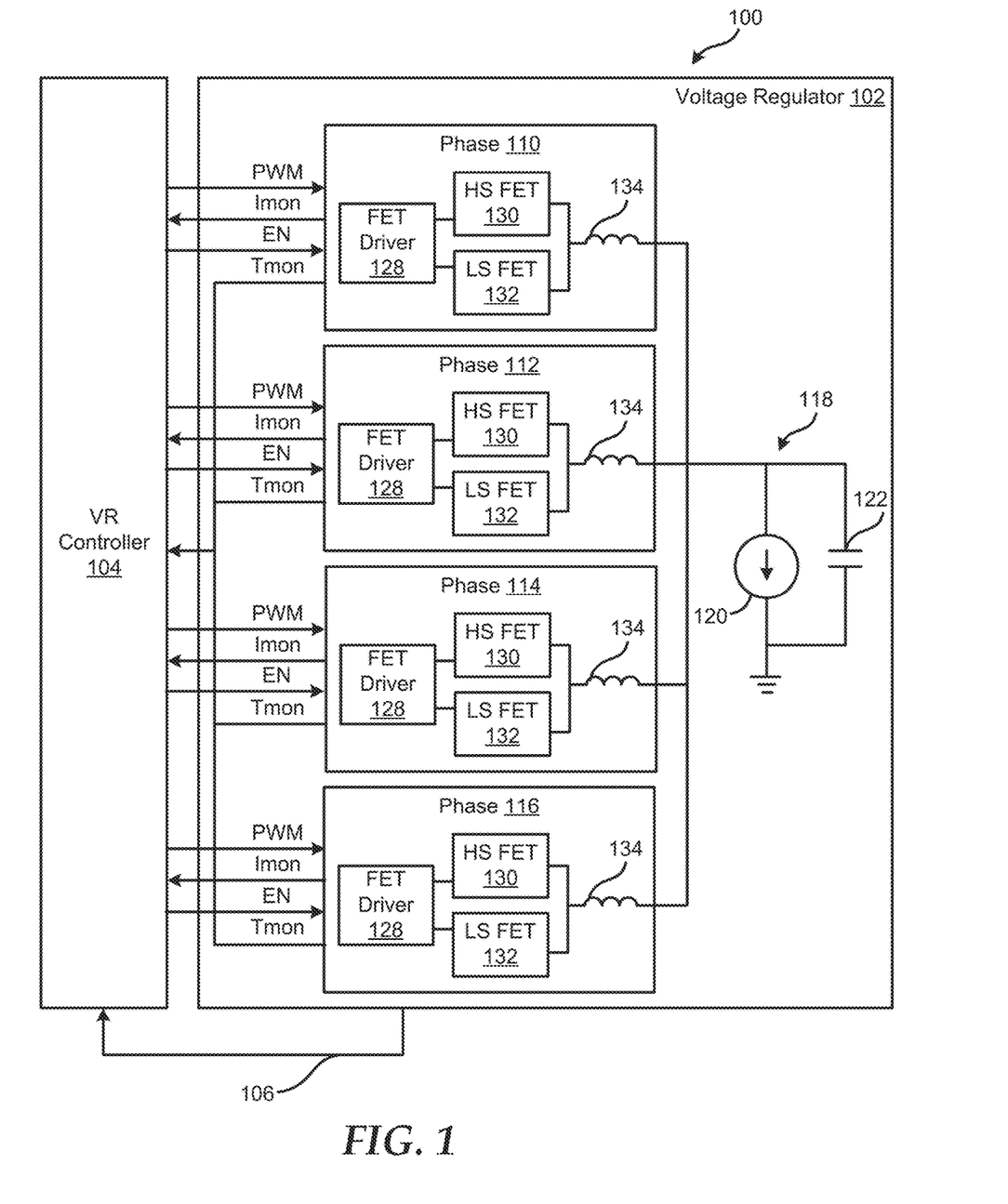
FIG. 1 is a block diagram of a voltage regulator system according to an embodiment of the present disclosure.

FIG. 1 shows a voltage regulator system 100 for an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Voltage regulator system 100 includes a voltage regulator power processor (referenced herein as voltage regulator) 102 and a voltage regulator (VR) controller 104. In an example, voltage regulator 102 and voltage regulator controller 104 may communicate on a communication bus 106. For example, communication bus 106 may provide VR controller 104 with an ability to perform voltage and current sensing of voltage regulator 102. Voltage regulator 102 includes any suitable number of power-stages Pstages 110, 112, 114, and 116, and a voltage output stage 118. Voltage output stage 118 includes a current source 120 and a capacitor 122. Each Pstage 110, 112, 114, and 116 includes a field-effect transistor (FET) driver 128, a high side (HS) FET 130, a low side (LS) FET 132, and an inductor 134. In certain examples, voltage regulator 102 may include any suitable number of additional components without varying from the scope of this disclosure.

In an example, VR controller 104 may provide each of Pstages 110, 112, 114, and 116 with a separate pulse width modulated (PWM) signal to control the operation of the particular Pstage via separate PWM pins. VR controller 104 may monitor a current for each of Pstages 110, 112, 114, and 116 via separate current monitor (Imon) pins and monitor a temperature for each of Pstages 110, 112, 114, and 116 via separate temperature monitor (Tmon) pins. VR controller 104 may provide each of Pstages 110, 112, 114, and 116 with a separate enable (EN) signal via separate EN pins. In certain examples, HS FET 130 and LS FET 132 within each Pstage 110, 112, 114, and 116 may operate as known in the art. In an example, current source 120 and capacitor 122 may operate as known in the art to create a particular regulated voltage at output stage 118 for a high power processor of an information handling system, such as processor 402 and 404 of information handling system 400 in FIG. 4, a graphics processing unit, or the like. In this example, the outputs of each of Pstages 110, 112, 114, and 116 may be tied together to provide a single high powered voltage output 118 to the processor.

In previous voltage regulator systems, fault identification for the different Pstages was provided only on the Tmon pin. However, as shown in FIG. 1, the Tmon pin for each Pstage is tied to the other Tmon pins, such that fault identification of a bad phase was difficult in previous voltage regulator systems of an information handling system. In previous voltage regulator systems the fault identification was difficult because the failure could have occurred on any of the phases and the VR controller would receive the indication on the Tmon input. In previous voltage regulator systems, a standard error message may be provided and logged in a baseboard management controller when a voltage regulator enters a fault status.

As used herein, a bad phase is non-working phase that may not be able to deliver power from voltage regulator input to the output. In an example, a bad phase may be caused by poor soldering that creates an open or short circuit, a bad component, a damaged component, a missing component, or the like.

Voltage regulator system 100 may be improved by utilizing both the Tmon pin and the Imon pin from Pstages 110, 112, 114, and 116 to identify faults and power stage in voltage regulator 102. The fault detection will be described with respect to VR controller 104 and the components of FIG. 2 below.

Figure 2:
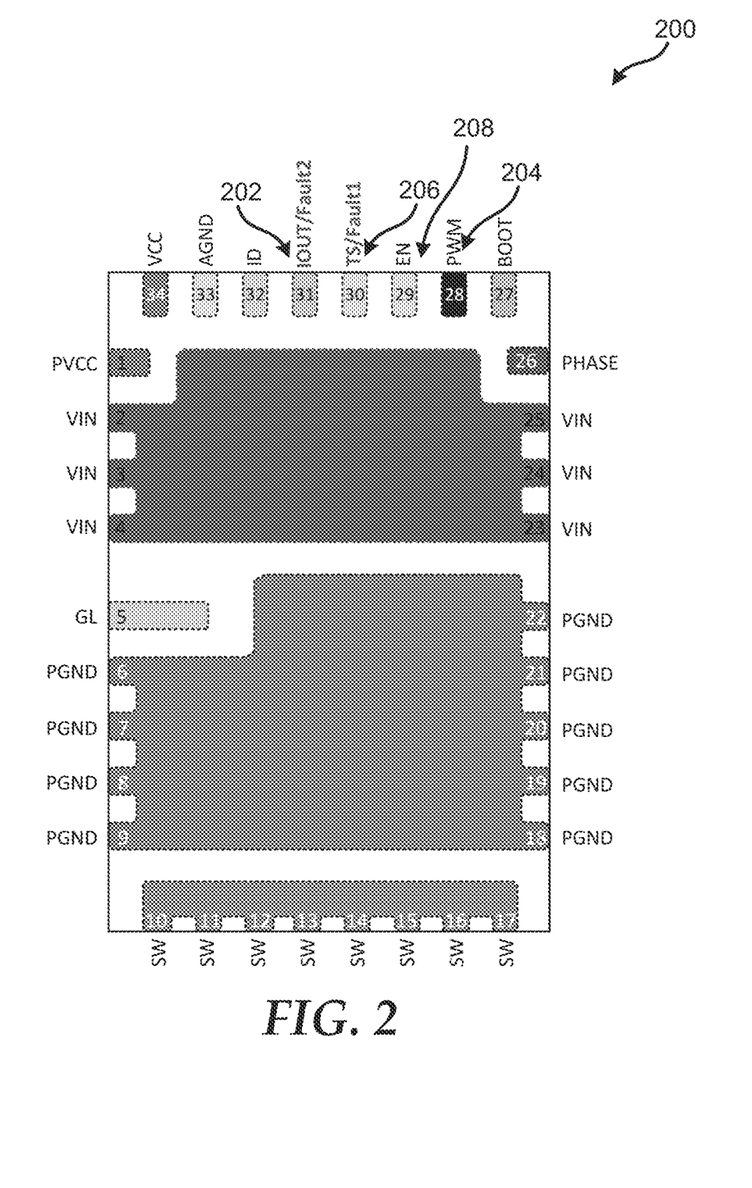
FIG. 2 is a diagram of a power-stage (Pstage) circuit pinout according to an embodiment of the present disclosure.

FIG. 2 illustrates a pinout of a Pstage package 200 according to an embodiment of the present disclosure. Pstage package 200 includes three functional dies, a HS FET, a LS FET and a driver. In an example, the FET driver may be placed on the top of HS FET. Pstage package 200 includes multiple pins as shown in FIG. 2. The inputs and outputs of only a few pins will be described herein, such as a first pin 202, a second pin 204, a third pin 206, and a fourth pin 208. In an example, first pin 202 may be referred to as Iout/Fault2 pin 202, second pin 204 may be referred to as a PWM pin 204, third pin 206 may be referred to as a TS/Fault 1 pin 206, and fourth pin may be referred to as enable (EN) pin 208. In certain examples, each Pstage 110, 112, 114, and 116 of FIG. 1 may be implemented within a different Pstage package 200. In an example, Iout/Fault2 pin 202 may be substantially similar to each of the Imon pins in FIG. 1, PWM pin 204 may be substantially similar to each of the PWM pins in FIG. 1, TS/Fault 1 pin 206 may be substantially similar to each of the Tmon pins in FIG. 1, EN pin 208 may be substantially similar to each of the EN pins in FIG. 1.

In previous Pstage packages, only a Ts/fault pin, such as Tsense or Tmon pin, was used to indicate a catastrophic fault for the Pstage. In these previous Pstage packages, the Ts/fault pin was pulled up above a threshold voltage, such as 2.6 Volts, 2.7 Volts, or 2.8 Volts, in response to a failure being detected. The Ts/fault pin was then reset after the failure is gone. The failure may be any suitable failure including, but not limited to, an over temperature (OTP) indication being triggered, a predetermined number of consecutive over current (OC) trips, and a FET short-thru being detected (HS FET short).

In an example, a voltage regulator may be improved by the pin out of Pstage package 200. In this example, VR controller 104 may monitor Iout/Fault2 pin 202 and TS/Fault1 pin 206. In certain examples, a Pstage may utilize Ts/Fault1 pin 206 of power-stage (Pstage) circuit 200 to indicate a catastrophic fault or failure in the power-stage (Pstage). In these examples, Ts/Fault1 pin 206 may pulled up above the threshold voltage in response to one of multiple failure being detected. After the failure is gone, VR controller 104 may cause power-stage (Pstage) circuit 200 to reset Ts/Fault1 pin 206 by pulling EN pin 208 low, pulling Vcc power-on reset (POR) pin low, or the like. In an example, the power-stage (Pstage) failure may be a boot voltage under voltage lock out (UVLO) being triggered by the failure after predetermined number, such as four, consecutive refresh charge cycles, over-temperature (OTP) being triggered, a predetermined number, such as eight, consecutive over-current (OC) trips, high-side transistor (HS FET) short, or the like.

In certain examples, the failure of a particular power-stage (Pstage) may be separated into first and second stages. In the first stage, power-stage (Pstage) circuit 200 may set a voltage on Ts/Fault1 pin 206 above the threshold voltage to indicate a failure. Then during a second stage, power-stage (Pstage) circuit 200 may set a voltage on Iout/Fault2 pin 202 to one of multiple voltages to indicate a fault type. In an example, any fault type may be a voltage that is different from a normal voltage on Iout/Fault2 pin 202, such as 1.2 Volts, 1.3 Volts, or the like. Exemplary voltages for Iout/Fault2 pin 202 and Ts/Fault1 pin 206 are illustrated in Table 1 below.

TABLE 1

| Fault type | Ts/Fault1 pin during stage 1 | Iout/Fault2 pin during stage 1 | Iout/Fault2 pin during stage 2 | Good Phase Iout/Fault2 pin during stages 1 and 2 |
| --- | --- | --- | --- | --- |
| Boot UVLO (recoverable) | 3.3 V | As is (no change) | 0 V | IMON = Vref (0 A, typically 1.2 V) |
| OCP (recoverable) | 3.3 V | As is (no change) | 1.6 V | IMON = Vref (0 A, typically 1.2 V) |
| OTP (recoverable) | 3.3 V | As is (no change) | 0.8 V | IMON = Vref (0 A, typically 1.2 V) |
| High-side FET short (unrecoverable) | 3.3 V (latched) | 3.3 V (latched) | 3.3 V (latched) | IMON = Vref (0 A, typically 1.2 V) |

As shown in Table 1, faults may be classified to two types, such as a recoverable failure and unrecoverable catastrophic failure. In response to an unrecoverable catastrophic failure, such as a high-side FET short, power-stage (Pstage) circuit 200 may pull Ts/Fault1 pin 206 high, and may immediately pull Iout/Fault2 pin 202 high to indicate that there is an unrecoverable catastrophic failure.

When a recoverable fault, such as boot UVLO, OCP, and OTP, have been detected, power circuit 200 may transition the voltage at Iout/Fault2 pin 202 from power-stage (Pstage) stage current monitoring pin to a fault indication pin in two stages as illustrated in Table 1 above. During the first fault stage, Ts/Fault1 pin 206 may be pulled high to indicate a fault and Iout/Fault2 pin 202 may kept as is. In response to a detection of these voltages on Ts/Fault1 pin 206 and Iout/Fault2 pin 202, VR controller 104 may set PWM pin 204 to a tristate in a minimum amount of time.

During the second stage, power-stage (Pstage) circuit 200 may receive PWM tristate signal on PWM pin 204 and in response, set Iout/Fault2 pin 202 to a preset voltage level as defined in Table 1 above to provide fault type indicator with a short enough time delay. In an example, if VR controller 104 determines that Iout/Fault2 pin 202 is not at a normal voltage, such as 1.2 Volts, then the VR controller may determine that the power-stage (Pstage) has faulted. VR controller 104 may provide the fault indication to a system accessible register such as a PMBus register. Given that the Iout/Fault2 pin is uniquely routed from a given Pstage to the VR controller, the controller can then determine which Pstage(s) in the voltage regulator power processor has a fault and the type of fault(s).

In an example, the fault type may be indicated by power-stage (Pstage) circuit 200 providing one of multiple voltages on Iout/Fault2 pin 202. For example, power-stage (Pstage) circuit 200 may provide a first voltage, such as 0 Volts, at Iout/Fault2 pin 202 to indicate that the power-stage (Pstage) has experienced a boot UVLO fault. Power-stage (Pstage) circuit 200 may provide a second voltage, such as 1.6 Volts, at Iout/Fault2 pin 202 to indicate that the power-stage (Pstage) has experienced an OCP fault. Power-stage (Pstage) circuit 200 may provide a third voltage, such as 0.8 Volts, at Iout/Fault2 pin 202 to indicate that the power-stage (Pstage) has experienced an OTP fault.

Figure 3:
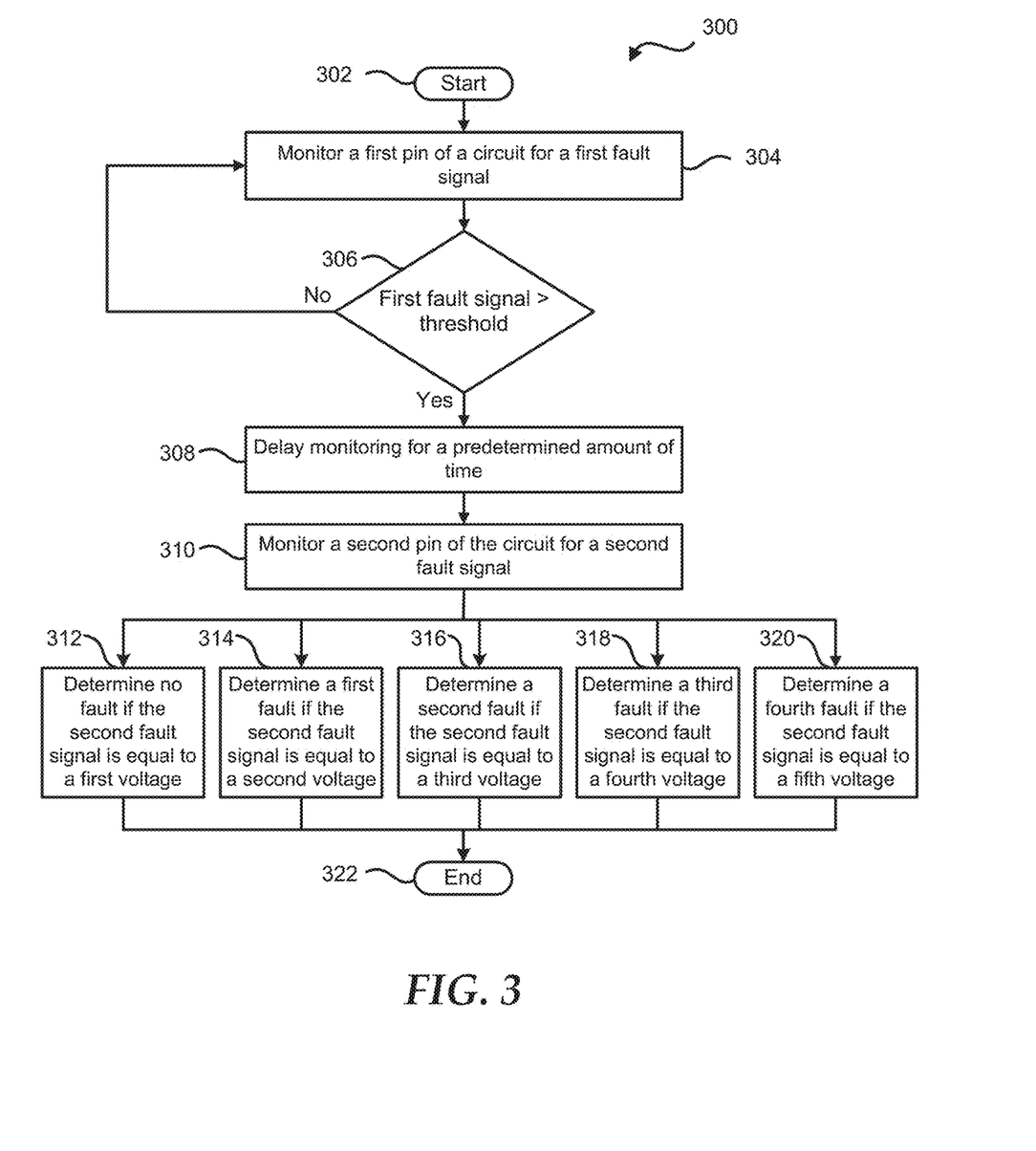
FIG. 3 is a flow diagram of a method for detecting a fault in a power-stage (Pstage) of a voltage regulator according to an embodiment of the present disclosure.

FIG. 3 illustrates a flow diagram of a method 300 for detecting a fault in Pstage of a voltage regulator according to at least one embodiment of the present disclosure, starting at block 302. In an example, the method 300 may be performed by any suitable component including, but not limited to, voltage regulator controller 102 of FIG. 1. Not every method step set forth in this flow diagram is always necessary, and certain steps of the methods may be combined, performed simultaneously, in a different order, or perhaps omitted, without varying from the scope of the disclosure.

At block 304, a first pin of Pstage package is monitored for a first fault signal. In an example, the power-stage (Pstage) circuit may be one of multiple Pstages of a voltage regulator. In certain examples, a voltage regulator controller may monitor the first pin of the power-stage (Pstage) circuit. At block 306, a determination is made whether a voltage of the first fault signal at the first pin is greater than a threshold voltage. The threshold voltage may be any suitable voltage. In an example, a normal voltage at the first pin may be between 1 Volt and 1.8 Volts. In this example, the threshold voltage may be any suitable voltage above 1.8 Volts, such as 2 Volts, 2.5 Volts, 3 Volts, or the like. In an example, the detection of the first pin being above the threshold may be a first stage of Pstage fault detection. In an example, the first pin of the circuit may be a temperature sense/fault 1 pin.

If the voltage of the first pin is not greater than the threshold voltage, the flow continues as described above at block 304. If the voltage of the first pin is greater than the threshold voltage, monitoring of fault signals is delayed for a predetermined amount of time at block 308. After the predetermined amount of time, a second pin of the circuit is monitored for a second fault signal at block 310.

At block 312, if a voltage of the second fault signal is equal to a first voltage, no fault is determined and the flow ends at block 322. At block 314, if a voltage of the second fault signal is equal to a second voltage, a first fault is determined and the flow ends at block 320. In an example, the second voltage may be any suitable voltage including, but not limited to, 0 Volts. In certain examples, the first fault may be that the power-stage (Pstage) has experienced a boot UVLO fault. At block 316, if the voltage of the second fault signal is equal to a third voltage, a second fault is determined and the flow ends at block 322.

In an example, the third voltage may be any suitable voltage including, but not limited to, 1.6 Volts. In certain examples, the second fault may be that the power-stage (Pstage) has experienced an OCP fault. At block 318, if the voltage of the second fault signal is equal to a fourth voltage, a third fault is determined and the flow ends at block 322. In an example, the fourth voltage may be any suitable voltage including, but not limited to, 0.8 Volts. In certain examples, the third fault may be that the power-stage (Pstage) has experienced an OTP fault. At block 320, if the voltage of the second fault signal is equal to a fifth voltage, a third fault is determined and the flow ends at block 322. In an example, the fifth voltage may be any suitable voltage including, but not limited to, 3.3 Volts. In certain examples, the fourth fault may be that the power-stage (Pstage) has experienced a high-side FET short. In example, these determinations may be made during a second stage of a fault detection.

Figure 4:
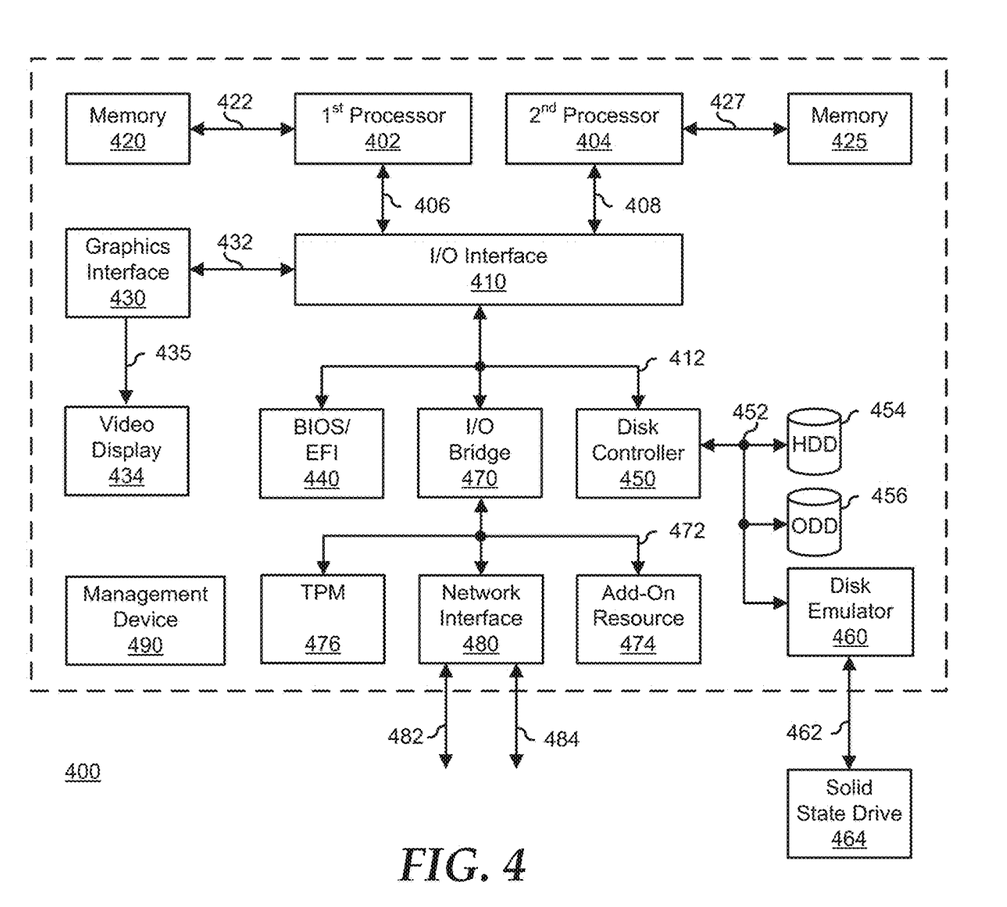
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 3394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI)

specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A voltage regulator system of an information handling system, the voltage regulator system comprising:
   a voltage regulator including multiple power-stages (Pstages); and
   a voltage regulator controller to communicate with the voltage regulator, the voltage regulator controller to:
      monitor for a first fault signal on a first pin of a circuit associated with a first Pstage of the Pstages;
      in response to a first voltage of the first fault signal at the first pin being greater than a threshold voltage:
         provide a pulse width modulated tristate signal to the first Pstage, wherein the pulse width modulated tristate signal causes the first Pstage to provide a signal on a second pin of the circuit; and
         monitor the second pin of the circuit for a second fault signal;
      determine whether a voltage of the second fault signal at the second pin is equal to a second voltage; and
      based on the voltage being equal to the second voltage, determine a first fault has occurred in the first Pstage.

2. The voltage regulator system of claim 1, wherein the first fault is a boot voltage under voltage lock out fault.

3. The voltage regulator system of claim 1, wherein the voltage regulator controller further to determine whether the voltage of the second fault signal is equal to a third voltage determine that a second fault has occurred in the first Pstage.

4. The voltage regulator system of claim 3, wherein the second fault is an over-current fault.

5. The voltage regulator system of claim 3, wherein the voltage regulator controller further to determine whether the voltage of the second fault signal is equal to a fourth voltage, and if so determine that a third fault has occurred in the first Pstage.

6. The voltage regulator system of claim 5, wherein the third fault is an over-temperature fault.

7. The voltage regulator system of claim 5, wherein the voltage regulator controller further to determine whether the second voltage of the second fault signal is equal to a fifth voltage, and if so determine that a fourth fault has occurred in the first Pstage.

8. The voltage regulator system of claim 7, wherein the fourth fault is a high-side transistor short.

9. A method comprising:
   monitoring, by a voltage regulator controller, for a first fault signal on a first pin of a circuit associated with a first power-stage (Pstage) of multiple Pstages in a voltage regulator of an information handling system;
   in response to a first voltage of the first fault signal at the first pin being greater than a threshold voltage
      provide a pulse width modulated tristate signal to the first Pstage, wherein the pulse width modulated tristate signal causes the first Pstage to provide a signal on a second pin of the circuit; and
      monitoring the second pin of the circuit for a second fault signal;
   determining whether a voltage of the second fault signal at the second pin is equal to a second voltage;
   based on the voltage being equal to the second voltage, determining, by the voltage regulator controller, that a first fault has occurred in the first Pstage.

10. The method of claim 9, wherein the first fault is a boot voltage under voltage lock out fault.

11. The method of claim 9, wherein the method further comprises determining whether the voltage of the second fault signal is equal to a third voltage, and if so determining that a second fault has occurred in the first Pstage.

12. The method of claim 11, wherein the second fault is an over-current fault.

13. The method of claim 11, wherein the method further comprises determining whether the voltage of the second fault signal is equal to a fourth voltage, and if so determining that a third fault has occurred in the first Pstage.

14. The method of claim 13, the third fault is an over-temperature fault.

15. The method of claim 11, wherein the method further comprises determining whether the second voltage of the second fault signal is equal to a fifth voltage, and if so determining that a fourth fault has occurred in the first Pstage.

16. The method of claim 15, wherein the fourth fault is a high-side transistor short.

17. An information handling system comprising:
a voltage regulator including multiple power-stages (Pstages); and
a voltage regulator controller to:
if a first voltage of a first fault signal at a first pin of a circuit associated with a first one of the Pstages is greater than a threshold voltage, then provide a pulse width modulated tristate signal to the first Pstage, wherein the pulse width modulated tristate signal causes the first Pstage to provide a signal on a second pin of the circuit, and determine whether a voltage of a second fault signal at a second pin of the circuit is equal to a second voltage; and
if the voltage of the second fault signal is equal to the first voltage, then generate an indication that a first fault has occurred in the first Pstage.

18. The information handling system of claim 17, wherein the first fault is a boot voltage under voltage lock out fault.

19. The information handling system of claim 17, wherein the voltage regulator further to determine whether the voltage of the second fault signal is equal to a third voltage, and if the voltage of the second fault signal is substantially equal to the third voltage, then generate an indication that a second fault has occurred in the first Pstage.

20. The information handling system of claim 19, wherein the second fault is an over-current fault.

* * * * *